United States Patent

Hayashi

Patent Number: 5,204,123
Date of Patent: Apr. 20, 1993

[54] APPARATUS FOR MANUFACTURING CONTINUOUS SHEETS OF BREAD DOUGH

[75] Inventor: Torahiko Hayashi, Utsunomiya, Japan

[73] Assignee: Rheon Automatic Machinery Co., Ltd., Utsunomiya, Japan

[21] Appl. No.: 770,072

[22] Filed: Oct. 1, 1991

Related U.S. Application Data

[62] Division of Ser. No. 686,091, Apr. 16, 1991, Pat. No. 5,091,202.

[30] Foreign Application Priority Data

Apr. 17, 1990 [JP] Japan .................................. 2-101078

[51] Int. Cl.$^5$ ................................................ A21C 3/04
[52] U.S. Cl. .................................. 425/141; 264/40.7; 425/145; 425/239; 425/367; 425/371; 426/517
[58] Field of Search ............... 425/140, 145, 363, 367, 425/371, 239, 141, 238, 256, 257; 264/288.4, 291, 40.7; 426/517

[56] References Cited

U.S. PATENT DOCUMENTS

| | | | |
|---|---|---|---|
| 2,642,013 | 6/1953 | Enoch | 425/371 |
| 3,298,060 | 1/1967 | Michalak | 425/367 |
| 3,898,024 | 8/1975 | Wockener | 425/145 |
| 4,144,009 | 3/1979 | Jackson et al. | 425/371 |
| 4,338,341 | 7/1982 | Glass | 425/239 |
| 4,692,107 | 9/1987 | Morikawa et al. | 425/140 |
| 4,776,785 | 10/1988 | Jones et al. | 425/239 |
| 4,849,234 | 7/1989 | Spinelli et al. | 426/517 |
| 4,880,375 | 11/1989 | Hayashi | 425/367 |

FOREIGN PATENT DOCUMENTS

| | | |
|---|---|---|
| 124487 | 11/1984 | European Pat. Off. |
| 128015 | 12/1984 | European Pat. Off. |
| 415714 | 3/1991 | European Pat. Off. |
| 104720 | 3/1917 | United Kingdom |
| 1115859 | 5/1968 | United Kingdom |
| 1228049 | 4/1971 | United Kingdom |

Primary Examiner—Jay H. Woo
Assistant Examiner—Khanh P. Nguyen
Attorney, Agent, or Firm—Guy W. Shoup; Patrick T. Bever

[57] ABSTRACT

An apparatus is disclosed for producing a continuous belt-like sheet of bread dough. The apparatus includes a dough hopper, vertical conveyors mounted on the facing side walls of the hopper, a dough outlet provided at the bottom of the hopper, and a pair of discharging rolls constituting part of the dough outlet, facing each other, and which are rotated so as to downwardly pass the bread dough passing therebetween. The width of the outlet and the peripheral speed of the discharging rolls are controllable so that a high-quality sheet of bread dough is continuously produced, while the gel structure of the dough is maintained uninjured.

1 Claim, 3 Drawing Sheets

APPARATUS FOR MANUFACTURING CONTINUOUS SHEETS OF BREAD DOUGH

This application is a division of application Ser. No. 07/686,091, filed Apr. 16, 1991, now U.S. Pat. No. 5,091,202.

BACKGROUND OF THE INVENTION

1. Field of the Invention

This invention relates to a method and apparatus for shaping elastic materials such as bread dough, and, more particularly, to a method and apparatus for producing a continuous sheet of bread dough.

2. Prior Art

In the prior art method for producing bread a large mass of dough, prepared by kneading flour, water, etc., by a mixer, is metered and then divided into small pieces of dough in the first process. Each piece is of the same weight as that of an end product. Sometimes the end product is very small. There are many inconveniences in this process in that when very small pieces of dough are to be formed at the beginning, the bread-making process is often complicated errors in the weight of the products are large, the efficiency of the process is hindered, and the range within which the size of the products can be changed is limited.

Producing bread by first forming a continuous belt-shaped dough sheet and then dividing it into pieces of dough that are the size of pieces of bread has also been developed as prior art. However, due to the characteristics of the bread dough itself, namely, the gel structure of gluten and the high elasticity resultant from such structure, it has been difficult to produce a continuous belt of bread dough with sections of a uniform weight. Hence, such as a belt of bread dough is conventionally produced by repeatedly passing bread dough between a pair of rollers and thus the elastic bread dough is forcibly moved and the gel structure is destroyed.

That is, this prior art method of producing bread dough is a way of plastic molding, in which rollers exert a repetitive application of force on the bread dough. This method is not suited for producing traditional high-quality bread comparable to hand-made bread. Thus, as mentioned above, in the method of the prior art, it is more often than not that after mixing the ingredients the bread dough is first divided into small round pieces. The dough pieces are then aged for a long time to restore the original gel structure of the protein. This effect is to be induced by an oxidizing agent that had been added in advance to the dough. The dough is then shaped and baked.

U.S. Pat. No. 4,629,110 discloses an apparatus for stretching dough in which a plurality of coveyors, each driven at a different speed, are serially disposed. It has a roller mechanism comprising a plurality of rollers that are freely rotatable about their axes, that constitute a straight path, and which are spaced apart from and located over the conveyors. Although in these prior art apparatuses the dough is smoothly stretched, the roller mechanism has a heavy and complex mechanism, so that it requires high production, maintenance, and repair costs. Therefore, an apparatus for stretching dough that is simple, functions steadily, and that has low production costs, has been desired.

Accordingly, one of the objects of this invention is to provide a method and apparatus for producing a continuous belt of bread dough without destroying the gel structure of the bread dough by allowing it to freely flow within the limit of its inherent elasticity.

Another object of this invention is to provide a method and apparatus for steadily and continuously supplying a belt-like bread dough sheet to continuously produce dough products.

Still another object of this invention is to provide a method and apparatus for producing a sheet of dough adaptable for the efficient production of dough products.

SUMMARY OF THE INVENTION

In accordance with these and other objects, this invention provides an improved method and apparatus for producing a sheet of continuous belt-like bread dough. In one aspect of this invention the method consists of the steps of conveying bread dough downward by vertical conveyors that are mounted on two sides of a dough hopper that consists of an inlet, a hopper body, and an outlet, and controlling the cross-sectional area of the outlet such that the amount of the bread dough discharged from the outlet corresponds to the supply of bread dough passing downward through the hopper body.

In accordance with another aspect of this invention an apparatus is provided that consists of a dough hopper, vertical conveyors mounted on the facing sides of the hopper, a dough outlet provided at the bottom of the hopper and consisting of a space between a pair of discharging rolls facing each other, and rotated so as to pass downwardly the bread dough passing therebetween, wherein the cross-sectional area of the outlet and the peripheral speed of the discharging rolls are controllable.

DESCRIPTION OF EMBODIMENTS OF THE INVENTION

Figure 1:
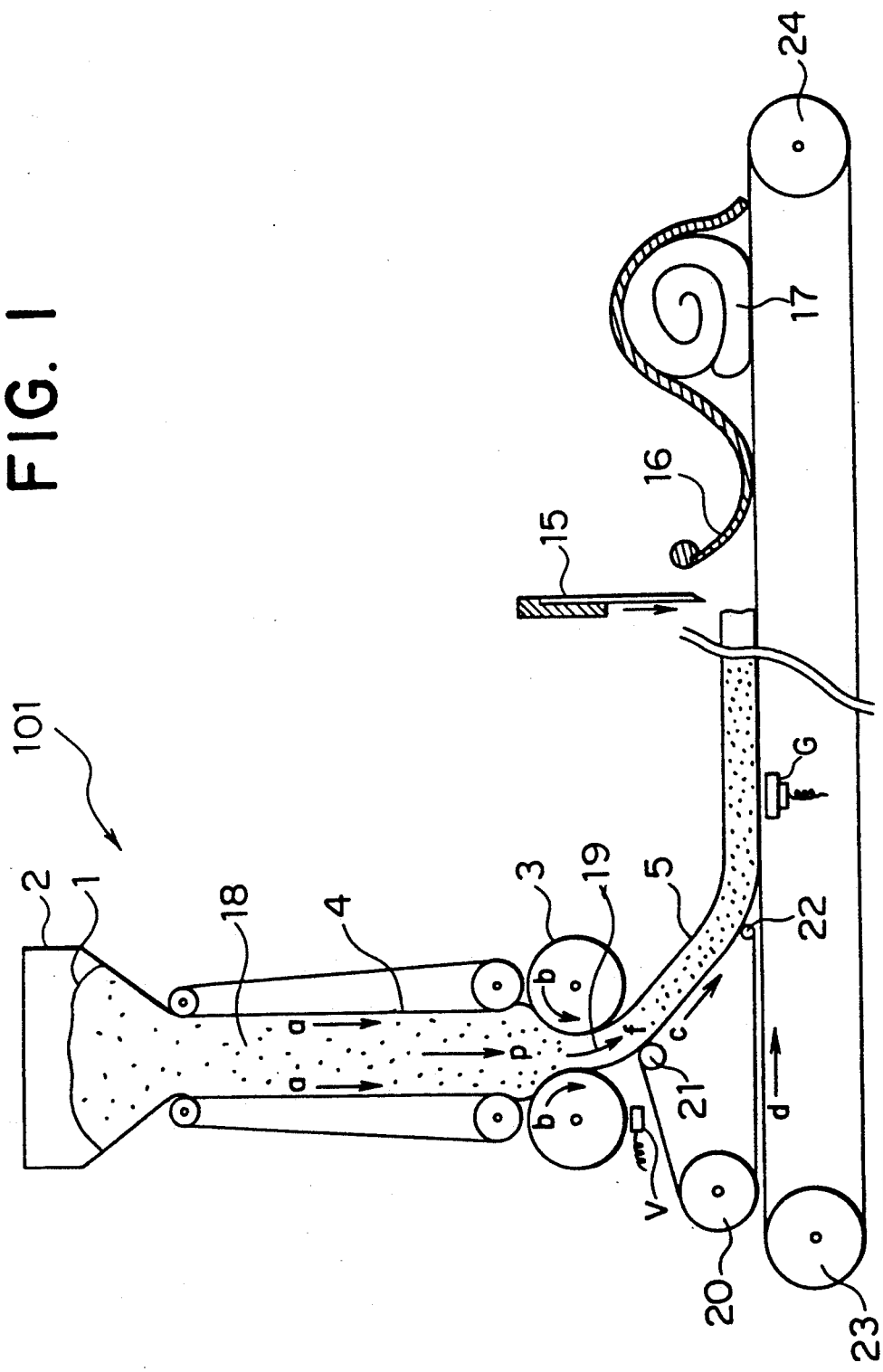
FIG. 1 is a schematic sectional front view of an embodiment of an apparatus of this invention for manufacturing a sheet of belt-like bread dough.
Figure 3:
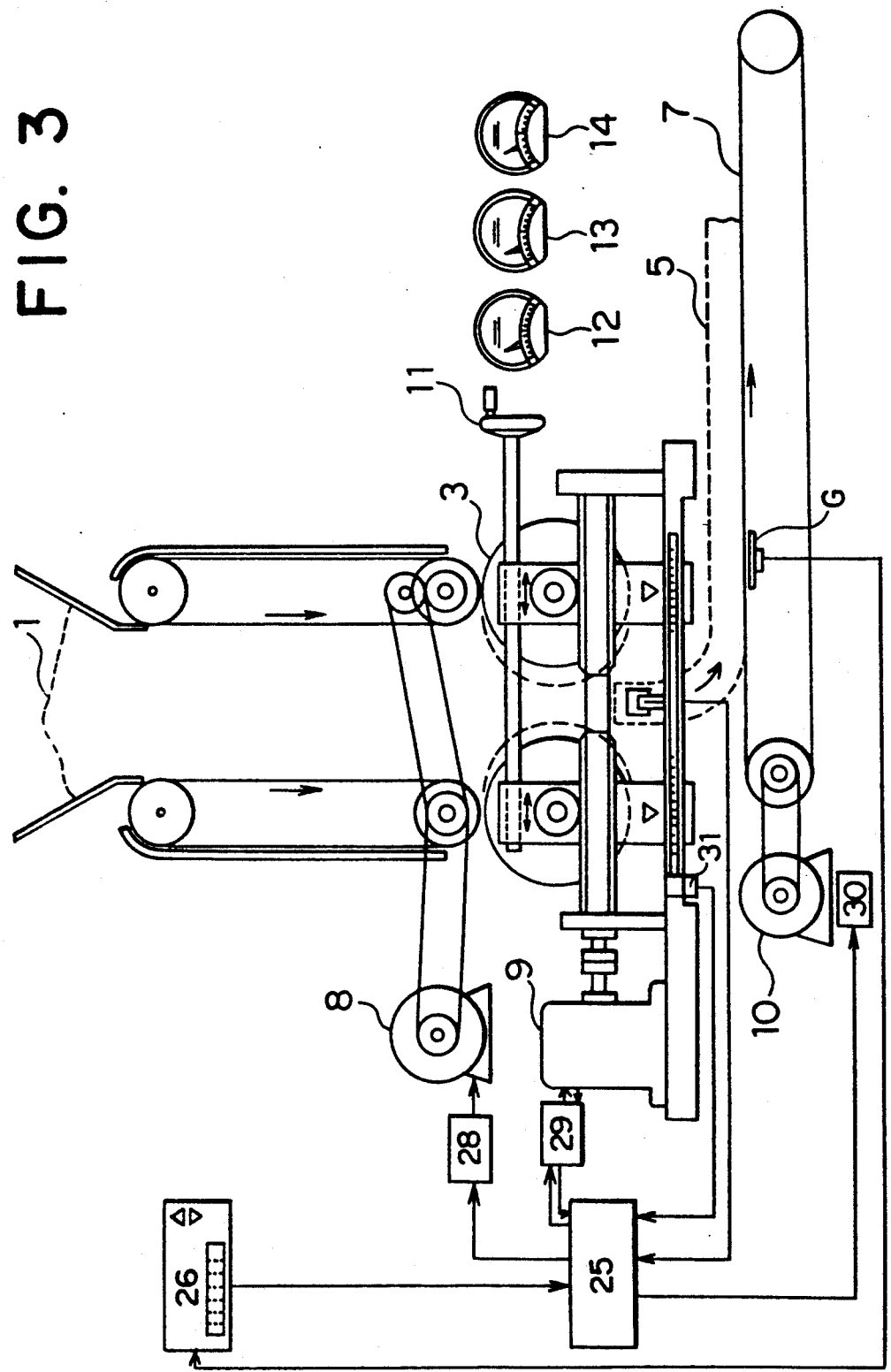
FIG. 3 is a schematic block diagram to explain the functional system of the apparatus.

In FIG. 1, a hopper 101 receives, stocks, and transfers bread dough 1, which has been kneaded by a mixer (not shown). The hopper consists of an inlet 2 and a box-like body 18 downwardly extending from the inlet, and a pair of discharging rolls 3 defining an outlet 19 therebetween. The inlet 2 has a wide top opening to receive dough and a narrowed bottom connected to the box-like hopper body 18. The body 18 is rectangular in cross section. It is confined by a front wall, a rear wall, and two side walls. Each of the two side walls is cosntituted by a vertical conveyor 4. Each vertical conveyor consists of a conveyor belt wound around two rolls, one of which is driven by a motor 8 (FIG. 3). The other roll is freely rotatable. The inner flight of each conveyor is designed to move downward, as shown by arrows g, at the same speed.

The speed of the vertical conveyors 4 is adjustable by adjusting the driving mechanism. The speed is selected so that the dough within the hopper body 18 descends at substantially the same speed as that of the vertical conveyors.

At the bottom of the body 18 a pair of discharging rolls 3 are disposed so that they face each other. They rotate in the same direction where they face each other. The gap between the rolls constitutes an outlet 19 for the dough. The distance between the discharging rolls 3 can be adjusted by moving one or both of the rolls horizontally, as will be explained later in connection with FIG. 3. Beneath the outlet 19 is provided an inclined conveyor 6 consisting of a belt wound around rolls 20, 21, and 22. The roll 21 is positioned immediately beneath the outlet 19 and forms a flight for the belt together with the roll 22 so that the belt forms an inclined passage for the dough pouring from the outlet 19. The roll 20 is driven by a motor (not shown), and the other two rolls are freely rotatable.

A transfer conveyor 7 is provided underneath the inclined conveyor 6. The transfer conveyor 7 consists of a conveyor belt wound about two rolls 23 and 24 and has a lengthy upper flight. The roll 23 is driven by a motor 10 (FIG. 3) and the other roll 24 is freely rotatable. Various shaping apparatuses, including a divider 15 for dividing the dough sheet 5 and a wind-up means 16, are disposed along the downstream part of the transfer conveyor 7. The divider 15 is a vertical cutter with an edge at its bottom, arranged to make vertical reciprocal movements to cut the dough sheet 5 on the transfer conveyor 7. The wind-up means 16 consists of a chain-belt form metal sheet suspended from a horizontal bar crossing the transfer conveyor 7 above it.

Figure 2:
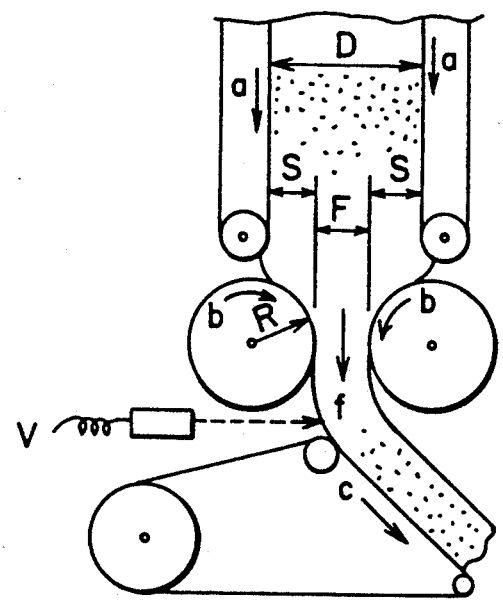
FIG. 2 is a schematic partial cross section of the apparatus of FIG. 1. It explains the functions of each component of the apparatus.

A speed sensor V is provided underneath one of the rolls 3 to measure the speed f of the dough sheet passing through the gap of the discharging rolls 3. A weight sensor G is mounted to a frame (not shown) under the top flight of the transfer conveyor 7 at a point downstream of the inclined conveyor 6. It continuously measure the weight g of the belt-like dough sheet 5 passing over it, so that the unit of production per unit time can always be indicated, based on the measurements of speed d. FIG. 2 schematically shows the positional and functional relationships among the components that constitute the apparatus. When the cross-sectional area of the space formed between the facing vertical conveyors 4 is assumed to be D, the cross-sectional area of the space formed between facing discharging rolls 3 is assumed to be F, the difference between the sectional areas D and F is assumed to be S, the speed of the vertical conveyors 4 is assumed to be a, the peripheral speed of the discharging rolls 3 is assumed to be b, and the flow speed of the dough sheet, which is measured just after it has passed through the discharging rolls 3 is assumed to be f, the function of the apparatus is designed so as to realize the following equation:

$$Da/Fb=k$$

wherein k is a constant.

The above is based on the observation that when an instantaneous force that is exerted on the bread dough that is being fed through the hopper body always corresponds to an instantaneous force that is exerted on the bread dough that is being discharged through the discharging rolls, the gel structure of the dough is not injured, and that this condition can be substantially fulfilled when the instantaneous volume of the dough descending through the hopper body is proportional to that of the dough going out through the discharging rolls, as shown by the above equation, provided that the proportion between b and f is within a certain range, which range depends on the nature of the dough being fed.

The cause of this limitation in the range of the proportion between b and f is the need to avoid the generation of an eddy that is generated by the resistance of dough around the lower part of the vertical conveyors against the driving force from the descending vertical conveyors, caused by the difference between D and F, which causes a turbulent flow.

In the apparatus of this invention the difference S between D and F is intentionally provided as a function that is needed to steadily discharge the accurately sheeted bread dough. It has been experimentally proven that even if F is smaller than D, the gel structure of the discharged dough remains uninjured in so far as the above-mentioned equation is fulfilled and it equals b or f is within a range of proportion to b that avoids a turbulent flow. This range varies widely depending on the consistency of the dough, the ratio of speed a to speed b, and the ratio of area F to area D etc.

In the apparatus of this invention dough flows freely while the inherent strength of the gel is kept unchanged. Dough sheeting is achieved by allowing the elastic behaviour of the gel of the dough to move freely so as to obtain products of a stable quality that are steadily discharged through the apparatus, without damaging the characteristics of the dough materials, such as viscoelasticity.

Since what destroys the gel structure is a shearing stress, and the stress is caused by excessive differences in the speed of the flow among parts of the dough and eddies that are generated inside the dough when it is flowing, the method and apparatus of this invention aims at reducing such a shearing stress.

In the method of this invention, a pair of vertical conveyors 4 mounted on the two sides of a hopper body causes dough 1 to move downward so that no difference in speed is generated between the downward movement of the surfaces of dough 1 facing the inner surface of the hopper body 18 and that of the central part of the dough 1. The gap between the pair of rolls 3 provided at the bottom of the hopper is adjusted depending on the gel strength of the dough, so that the generation of the shearing stress at around the outlet is controlled, and when the gap between the rolls are adjusted, the peripheral speed of the rolls 3 is simultaneously adjusted so that the following equation is automatically realized:

$$Da/Fb=k$$

Thus, due to this mechanism of this invention, the generation of an eddy around the outlet of the discharging rolls is avoided so that a constant quantity of the sheeted bread dough can be continuously and steadily discharged.

In FIGS. 1 and 2, the conveying speed of the inclined conveyor 6 is indicated by c, and that of the transfer conveyor 7, by d. They are substantially the same as the speed of f of the dough coming out of the rollers 3.

In FIG. 3, the rotational speeds of all motors for driving the conveyors and discharging rolls are controlled by a computor 25. The lower roll of one of the vertical conveyors is driven by a motor 8. A chain belt is wound around a sprocket attached to the shaft of the motor and the shaft of the roll to convey the driving force to the roll. The lower roll of the other conveyor is also similarly connected by another chain belt and sprocket assembly so that the latter is driven via the roll of the first conveyor. The discharging rolls 3 are driven by the motor 9. The rolls are operatively connected to the motor 9 by a horizontal shaft extending from the motor. The shaft is provided with worms meshing with a worm wheel mounted to an end of each discharging roll 3. The transfer conveyor 7 is connected to a motor 10 by means of a chain and sprocket assembly. Inverters 28, 29, and 30 for adjusting each of the speeds of the motors are connected between the motors 8, 9, and 10 and the computor 25. The computer 25 always determines the optimum instantaneous speeds for each of the motors based on information on the peripheral speed of the rolls 3, b.

This information is derived from the speed of the motor 9 for driving the roll 3 given through feedback lines connecting the motor 9 and the computer 25 via the inverter 29, discharging dough speed f derived from sensor V, weight of the dough sheet 5 derived from sensor G, and on the gap of the outlet 19, which is obtained by a counter 31 provided near the base for the motor 9. The information on the gap is obtained by a gap-setting handle 11, which is attached to an end of a bar that is threaded through an end plate mounted on each discharging roll 3. When the handle 11 is operated the gap is set such that a clockwise movement of the handle causes the rolls to move apart and a counterclockwise movement causes the rolls to move closer. The drawing shows a manually operated handle, but it can be operated automatically based on computer calculation. A gap indicator 12, discharging roll peripheral speed meter 13, and discharging dough speed meter 14, show relevant values for visual observation.

The operation of the apparatus of this invention will now be explained by reference to FIGS. 1 and 3. The bread dough is fed into the hopper inlet 2 and then to the box-like body. When the vertical conveyors 4 start moving downward as shown by arrows a and the rolls 3 start rotating as shown by arrows b, a belt-like bread dough sheet 5 comes out of the outlet 19. The discharged belt-like bread dough is transferred by an inclined conveyor 6 to a transfer conveyor 7. The dough sheet is then cut by the divider 15, rolled up by the wind-up means 16, and fed to a subsequent station.

When the dough leaves the rolls 3, the speed of the dough flow f and the peripheral speed b of the discharging rolls 3 are compared by the computer 25. When the ratio between them is not within the standard range, the handle 11 is operated to adjust the gap so as to attain a ratio within the standard range. If the handle 11 is operated, both the sectional area F of the outlet and the peripheral speed b of the rolls are automatically adjusted by the computer 25 so as to realize the equation $D\ a/F\ b = k$.

The adjustment is carried out such that when the handle 11 is operated the information from the computer 31 is fed into the computer, and then the computer causes an inverter 29 to drive. It controls the motor 9 according to the gap information to adjust the speed of the discharging rolls 3.

The weight sensor G mounted on the transfer conveyor 7 detects the weight of the produced dough sheet 5. The weight information is fed into the computer, via an output indicator 26, to simultaneously drive inverters 28, 29, and 30 so that the rotational speeds of the motors for driving the vertical conveyors 4, the discharging rolls 3, and the transfer conveyors 10, respectively, are adjusted by using predetermined conversion ratios, so as to automatically maintain a constant production amount of the dough sheet throughout the operation of the apparatus. The production amount of the dough sheet is indicated by an output indicator 26.

The Effects of the Invention

As is explained above, by providing vertical feeding conveyors and discharging rolls so that the amount of the supply of bread dough substantially coincides with the discharge of the bread dough, and by controlling the gap between the discharging rolls so that the discharging speed of the dough corresponds to the peripheral speed of the discharging rolls, the method and apparatus of this invention can continuously produce a stable high-quality belt-like sheet of bread dough, while maintaining the gel structure of the dough uninjured.

I claim:

1. An apparatus for producing a continuous belt-like sheet of bread dough, comprising
    a dough hopper having a top, a bottom and four sides, an inlet provided at the top, vertical conveyors provided on two opposing ones of the four sides, and a dough outlet provided at the bottom of the hopper, and
    a pair of discharging rolls that constitute a part of the dough outlet, facing each other and separated by a distance, and rotated so as to pass downwardly the bread dough passing therebetween,
    means for adjusting the distance between the discharging rolls,
    means for adjusting a peripheral speed b of the discharging rolls,
    means for adjusting a downward speed a of the vertical conveyor, and
    means for controlling the distance, the peripheral speed and the downward speed such that the following equation is realized;

$$D \times a / F \times b = k$$

wherein
    D is a sectional area defined by the vertical conveyors.
    F is a sectional area defined by the discharging rolls. and
    k is a constant.

* * * * *